US012651083B2

(12) United States Patent
Vlaiko et al.

(10) Patent No.: US 12,651,083 B2
(45) Date of Patent: Jun. 9, 2026

(54) DATA STORAGE DEVICE AND METHOD FOR USING A SECONDARY RENDERING ENGINE FOR PRIORITIZED DATA

(71) Applicant: Sandisk Technologies, Inc., Milpitas, CA (US)

(72) Inventors: Julian Vlaiko, Kfar Saba (IL); Judah Gamliel Hahn, Ofra (IL); Ariel Navon, Revava (IL); Shay Benisty, Beer Sheva (IL); Aki Bleyer, Even Yehuda (IL); Alexander Bazarsky, Holon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 200 days.

(21) Appl. No.: 18/661,968

(22) Filed: May 13, 2024

(65) Prior Publication Data

US 2025/0348609 A1 Nov. 13, 2025

(51) Int. Cl.
*G06F 21/00* (2013.01)
*G06F 12/00* (2006.01)
*G06F 21/62* (2013.01)
*G06T 1/20* (2006.01)

(52) U.S. Cl.
CPC ............ *G06F 21/6218* (2013.01); *G06T 1/20* (2013.01)

(58) Field of Classification Search
CPC ....... G06F 21/6218; G06F 21/62; G06T 1/60; G06T 1/20
USPC ..................................................... 726/27–30
See application file for complete search history.

(56) References Cited

U.S. PATENT DOCUMENTS

| | | | | |
|---|---|---|---|---|
| 7,636,825 | B2 * | 12/2009 | Mosek ................ | G06F 12/1441 726/27 |
| 11,069,128 | B2 | 7/2021 | Schmalstieg et al. | |
| 11,095,754 | B2 * | 8/2021 | Oye ........................ | H04L 67/63 |
| 11,206,270 | B2 * | 12/2021 | Onyekwelu ............. | G06F 21/32 |
| 11,233,776 | B1 * | 1/2022 | Muddapappu ...... | G06F 21/6209 |
| 11,694,328 | B2 | 7/2023 | Boettger et al. | |
| 11,720,302 | B2 * | 8/2023 | Pekarske ............. | G06F 21/6245 726/27 |
| 11,730,545 | B2 | 8/2023 | Qiu et al. | |
| 11,816,771 | B2 | 11/2023 | Muhsin et al. | |
| 2009/0276858 | A1 * | 11/2009 | Ushijima ............... | G06Q 30/02 726/27 |
| 2010/0011226 | A1 * | 1/2010 | Inagaki ................... | G06F 21/10 713/189 |

(Continued)

*Primary Examiner* — Bharat Barot
(74) *Attorney, Agent, or Firm* — Crowell & Moring LLP

(57) ABSTRACT

A data storage device and method for using a secondary rendering engine for prioritized data are described herein. In one embodiment, a data storage device is provided comprising a memory and one or more processors. The one or more processors, individually or in combination, are configured to: receive requests for non-private and private data stored in the memory; send the non-private data to a primary rendering engine in a host to render the non-private data on a display device; and send the private data to a secondary rendering engine external to the host to render the private data on the display device in response to a user being authorized to access the private data, wherein by sending the private data to the secondary rendering engine instead of to the primary rendering engine in the host, the private data is inaccessible by the host. Other embodiments are disclosed.

20 Claims, 8 Drawing Sheets

(56)        References Cited

U.S. PATENT DOCUMENTS

2020/0388363  A1     12/2020   Docktor et al.
2025/0362860  A1*   11/2025   Chan ........................ G06T 1/60

* cited by examiner

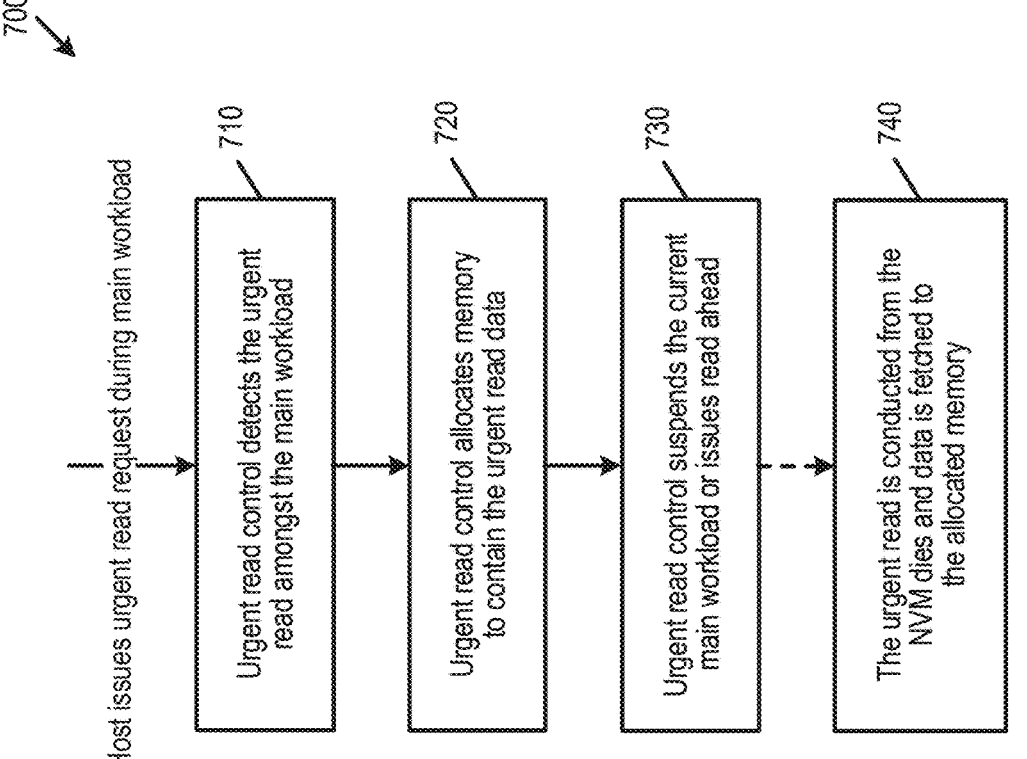

700

Host issues urgent read request during main workload

710

Urgent read control detects the urgent read amongst the main workload

720

Urgent read control allocates memory to contain the urgent read data

730

Urgent read control suspends the current main workload or issues read ahead

740

The urgent read is conducted from the NVM dies and data is fetched to the allocated memory

FIG. 7

DATA STORAGE DEVICE AND METHOD FOR USING A SECONDARY RENDERING ENGINE FOR PRIORITIZED DATA

BACKGROUND

Virtual reality (VR) and augmented reality (AR) applications are getting more common, and the number of devices that use such applications is expected to grow. A virtual reality device typically takes the form of goggles with a built-in screen and lenses that display a digitally-created world, where the user's entire field of view is of the digitally-created world and not the "real world" outside of the goggles. In contrast, an augmented reality device can present a display overlaid on the user's field of view of the "real world." An augmented reality device can take the form of goggles but can also take the form of additional devices, such as a computing device (e.g., a mobile phone or tablet) with a camera and a display screen that displays actual objects detected by the camera as well as an overlay generated by the mobile device.

BRIEF DESCRIPTION OF THE DRAWINGS

FIG. 7 is a flow chart of a method of an embodiment for executing an urgent read command.

DETAILED DESCRIPTION

Figures 1A, 1B, 1C:
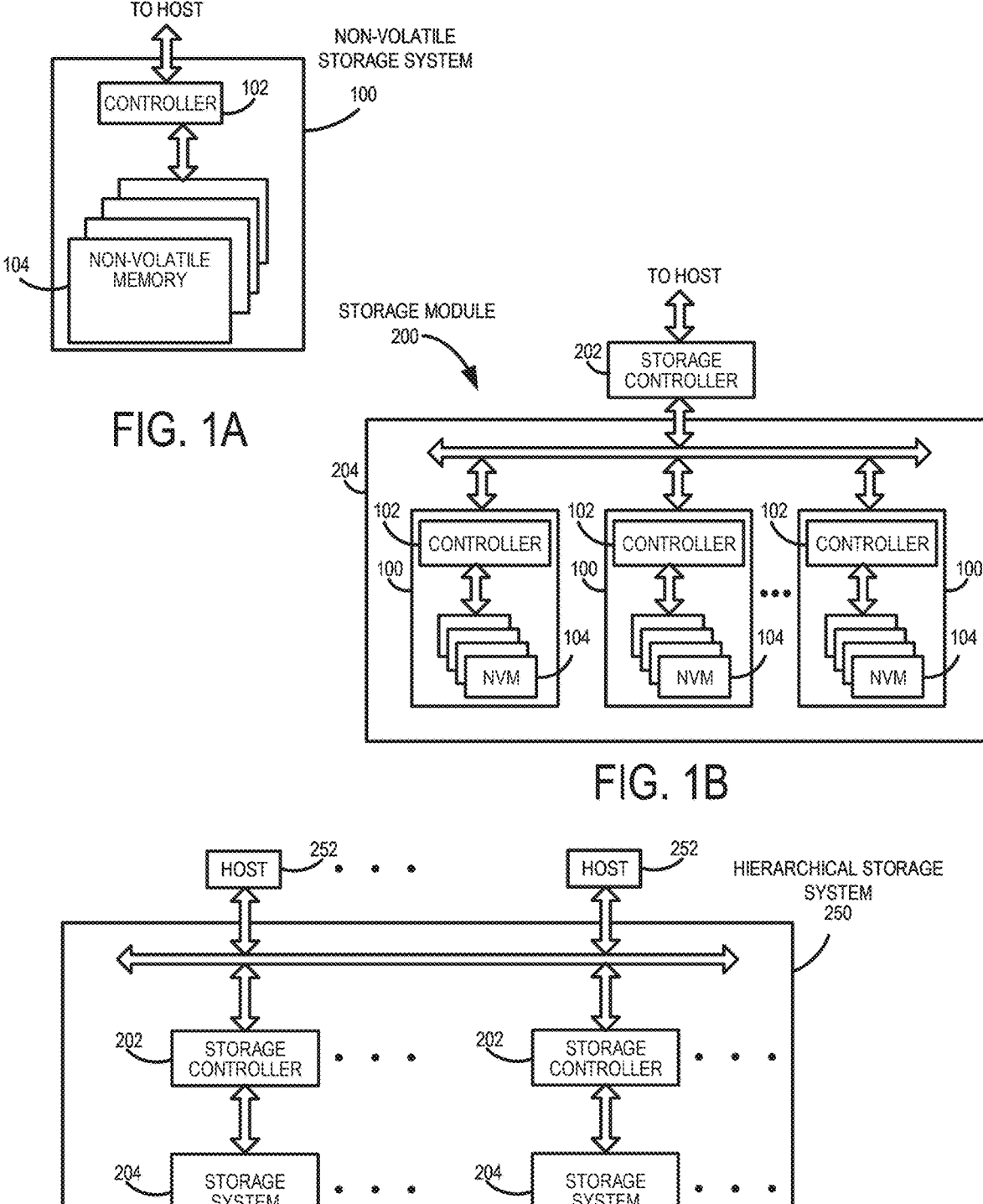
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for using a secondary rendering engine for prioritized data. In one embodiment, a data storage device is provided comprising a memory and one or more processors. The one or more processors, individually or in combination, are configured to: send, to a host, non-restricted data stored in the memory in response to receiving information from the host that identifies the non-restricted data, wherein the host comprises a primary rendering engine configured to render the non-restricted data on a display device; receive, from the host, information about a user; based on the information about the user, determine whether the user is authorized to access restricted data stored in the memory; and in response to determining that the user is authorized to access the restricted data, send the restricted data to a secondary rendering engine configured to render the restricted data as an overlay to the rendered non-restricted data on the display device, wherein by sending the restricted data to the secondary rendering engine instead of to the primary rendering engine in the host, the restricted data is unexposed to the host.

In some embodiments, the display device comprises a virtual reality display device.

In some embodiments, the display device comprises an augmented reality display device.

In some embodiments, the secondary rendering engine is located in the data storage device.

In some embodiments, the secondary rendering engine is located external to the data storage device.

In some embodiments, the non-restricted data and the restricted data are stored in different partitions in the memory.

In some embodiments, the secondary rendering engine comprises a graphics processing unit (GPU) and a frame buffer.

In some embodiments, the one or more processors, individually or in combination, are further configured to directly or indirectly identify the non-restricted data to read from the memory from information received from the host.

In some embodiments, the one or more processors, individually or in combination, are further configured to read the restricted data from the memory using an urgent read command.

In some embodiments, the one or more processors, individually or in combination, are further configured to store the restricted data in a host memory buffer.

In some embodiments, the memory comprises a three-dimensional memory.

In another embodiment, a method is provided that is performed in a data storage device comprising a memory and in communication with a host comprising a primary rendering engine. The method comprises: receiving requests for non-private and private data stored in the memory; sending the non-private data to the primary rendering engine in the host to render the non-private data on a display device; and sending the private data to a secondary rendering engine external to the host to render the private data on the display device in response to a user being authorized to access the private data, wherein by sending the private data to the secondary rendering engine instead of to the primary rendering engine in the host, the private data is inaccessible by the host.

In some embodiments, the secondary rendering engine is further configured to receive an identification of specific slots in a video buffer of the primary rendering engine in which the rendered private data is to be stored.

In some embodiments, the secondary rendering engine is further configured to receive an identification of a rendering format.

In some embodiments, the secondary rendering engine is further configured to interleave the rendered private data with the rendered non-private data.

In some embodiments, the secondary rendering engine is further configured to binary-wise add the rendered private data with the rendered non-private data.

In some embodiments, the secondary rendering engine is further configured to receive the rendered non-private data from the primary rendering engine, modify the rendered non-private data with the rendered private data, and provide a result of the modification to the display device.

In some embodiments, the secondary rendering engine is further configured to output the rendered private data as key value (KV) pairs or in a logical block address (LBA) format.

In some embodiments, the display device comprises a virtual reality display device or an augmented reality display device.

In another embodiments, a data storage device comprising: a memory; and means for providing private data stored in the memory to a secondary rendering engine external to a host comprising a primary rendering engine in an augmented reality/virtual reality environment in response to a user being authenticated to access the private data.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
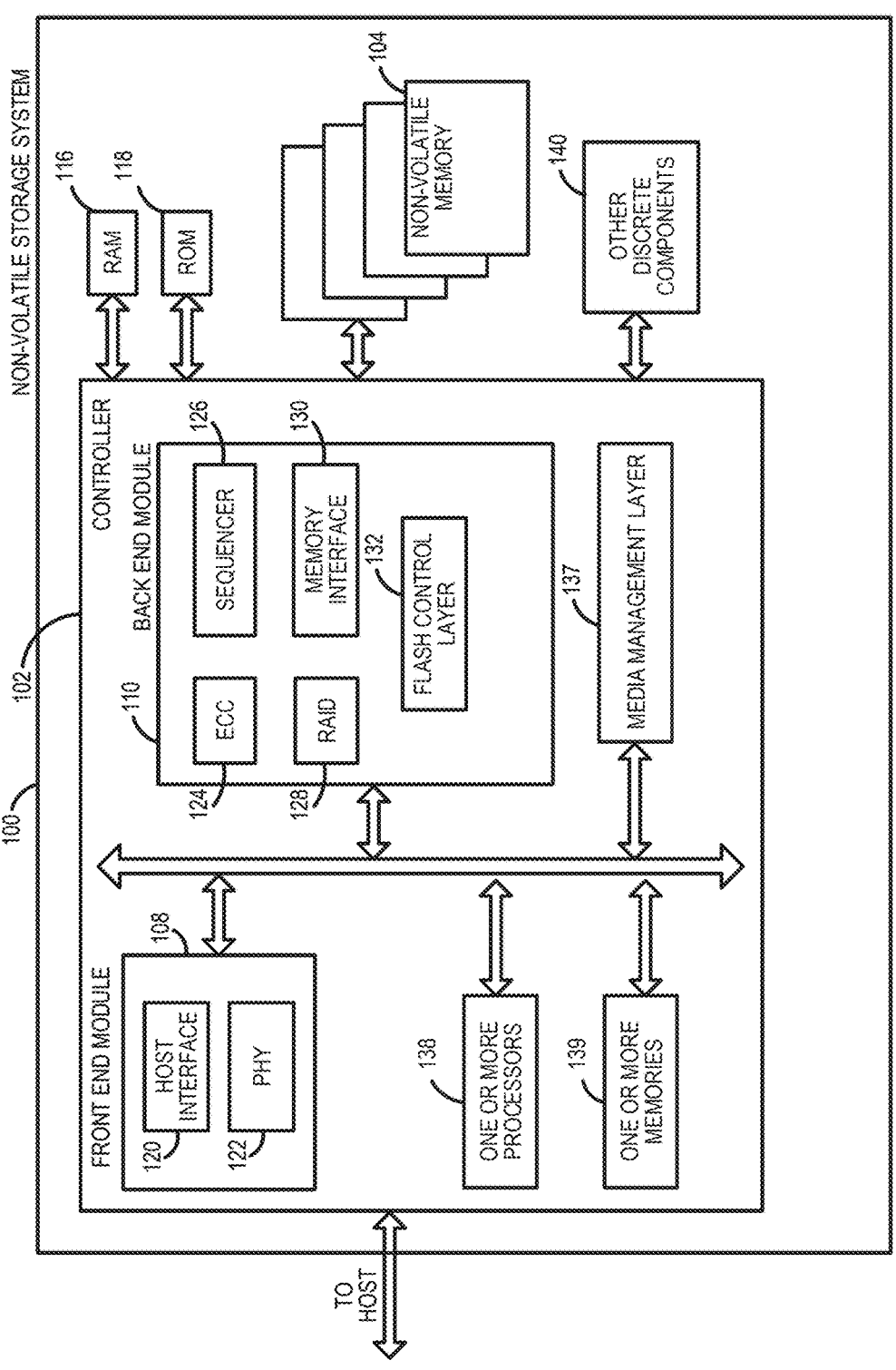
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
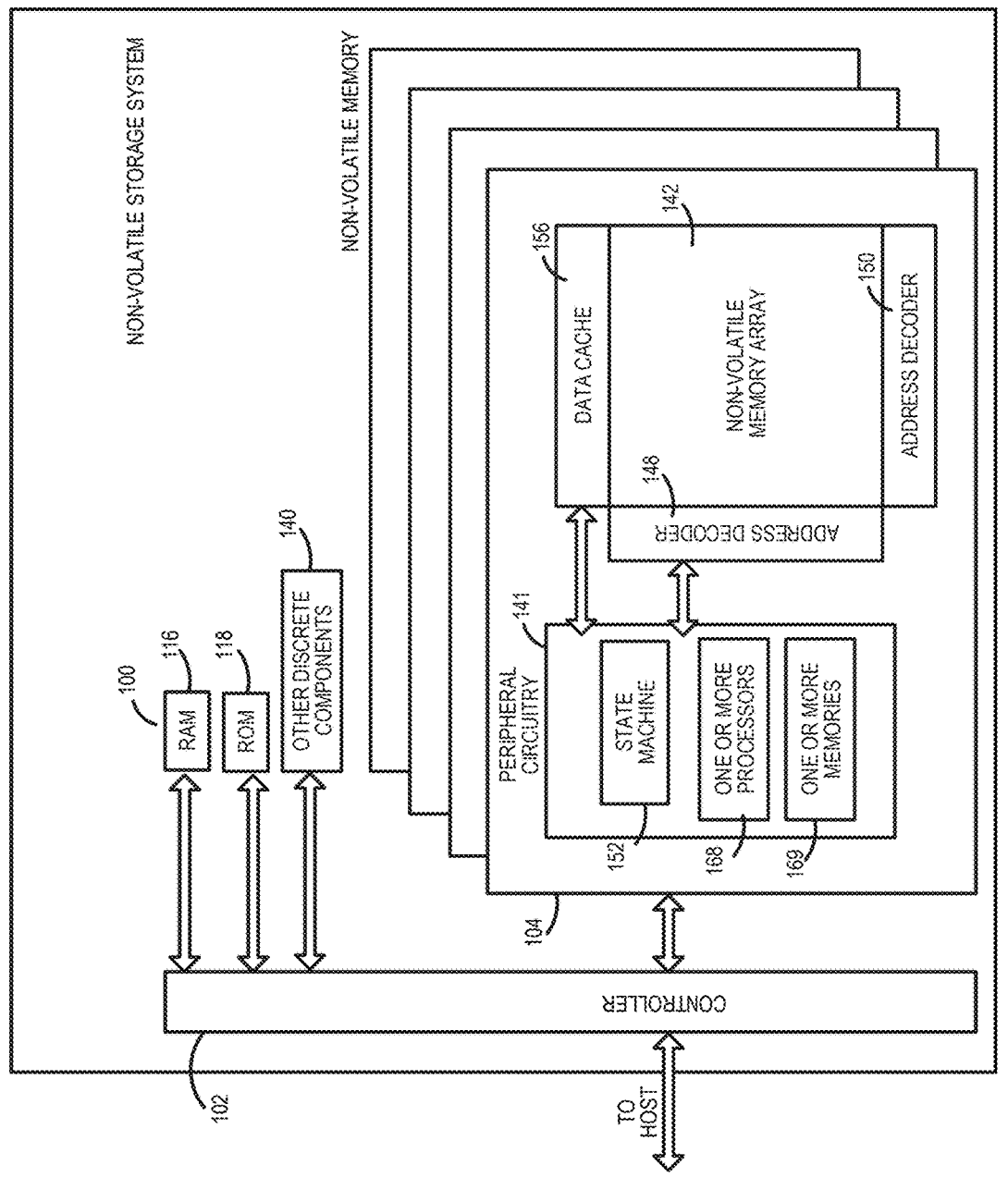
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
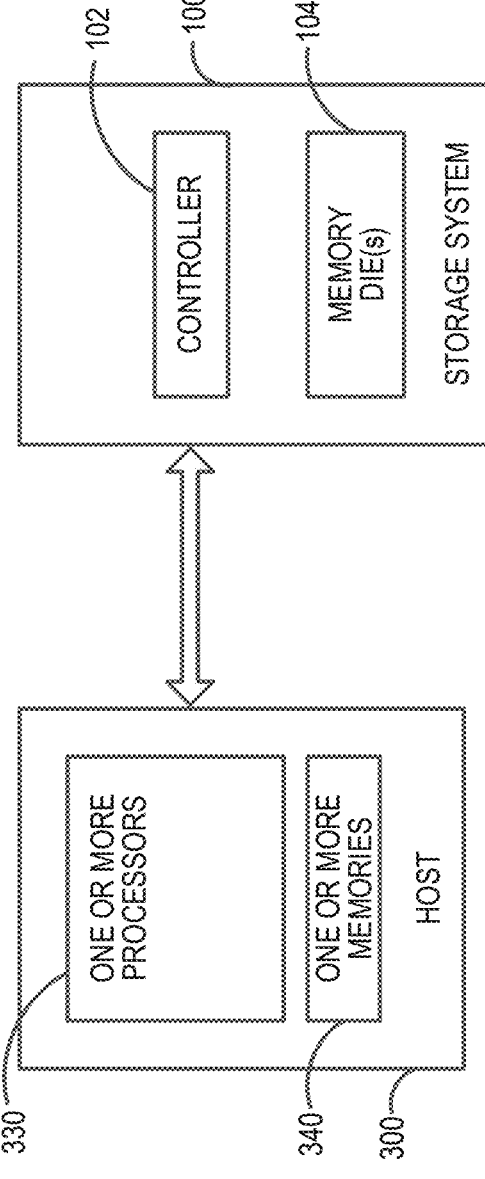
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, virtual reality (VR) and augmented reality (AR) applications are getting more common, and the number of devices that use such applications is expected to grow. A virtual reality device typically takes the form of goggles with a built-in screen and lenses that display a digitally-created world, where the user's entire field of view is of the digitally-created world and not the "real world" outside of the goggles. In contrast, an augmented reality device can present a display overlaid on the user's field of view of the "real world." An augmented reality device can take the form of goggles but can also take the form of additional devices, such as a computing device (e.g., a mobile phone or tablet) with a camera and a display screen that displays actual objects detected by the camera and an overlay to the display generated by the computing device.

The data that is used in a virtual reality or augmented reality display can be private data that is retrieved from a data storage device according to the identity of a user and/or other information. As used herein, "private data" refers to data that is relatively more restricted than non-private data. As such, the terms restricted data and non-restricted data are sometimes used herein. Private data can have a plurality of degrees of privacy. Consider, for example, a hospital environment, in which the user is a member of the medical staff (e.g., a doctor, a nurse, a security guard, etc.) wearing augmented goggles that overlay a display of data related to a patient when the user that is looking at the patient, is in the patient's room, is near the patient, etc. The data that is displayed can depend on the patient's identity and/or the user's identity. For example, if the user is a doctor, the doctor may see certain statistics about the patient's history, notes from other doctors, and the current status of the patient. If the user is a nurse, the nurse may see when the patient was last attended to, the next scheduled check-up time, and any known allergies—but perhaps not the level of private data that the doctor is able to see. If the user is a security guard, the security guard may see if the patient has any associated security risks, such as past violence or a potential outside threat—but perhaps not the level of private data that the doctor and nurse are able to sec. In addition, if the patient is a security representative, the data that is shown to hospital staff may be restricted.

Data storage devices used with virtual reality and augmented reality applications are typically generic devices and are not customized for the needs of a specific segment. As such, these data storage devices may not provide the required level of privacy. For example, a host that uses an AR/VR device may include several external active applications, and any given application may not want its private information displayed as augmented/virtual content (e.g., an overlay of textual and/or graphical information associated with visual data) that is shared/exposed to different applications at the host in native digital form, which can be relatively easy to view and copy. While some prior data storage devices can limit access to data according to user restrictions, such restrictions may not provide the adequate privacy safeguards in certain situations.

The following embodiments can be used to address this issue by providing a direct interface between the data storage device that stores the private data and a secondary rendering engine that provides the private data in the augmented/virtual environment. Through this direct interface, prioritized and/or secured data can be passed according to the restrictions of the current user and/or the priority of the request. In this way, native private data in digital form will not be exposed to applications that the host is running, thus enhancing privacy of the user and guarding sensitive information against potential malware. Further, these embodiments can improve the utilization of data storage devices with augmented reality and virtual reality devices, allowing a competitive edge in a growing market.

In one embodiment, a secondary rendering engine is introduced in augmented reality and virtual reality devices to display data to the user with a direct link to the data storage device. This data can be either presented in an overlay mode (as in augmented reality devices) or as a part of a virtual reality application. The data can be associated with the identity of the user, and the priority of the data can depend on the user, application, location, and/or other factors (e.g., environmental factors). This data can be transferred to the secondary rendering engine bypassing the host, such that the native digital data is not exposed to the host and the other applications running on it.

Figure 4:
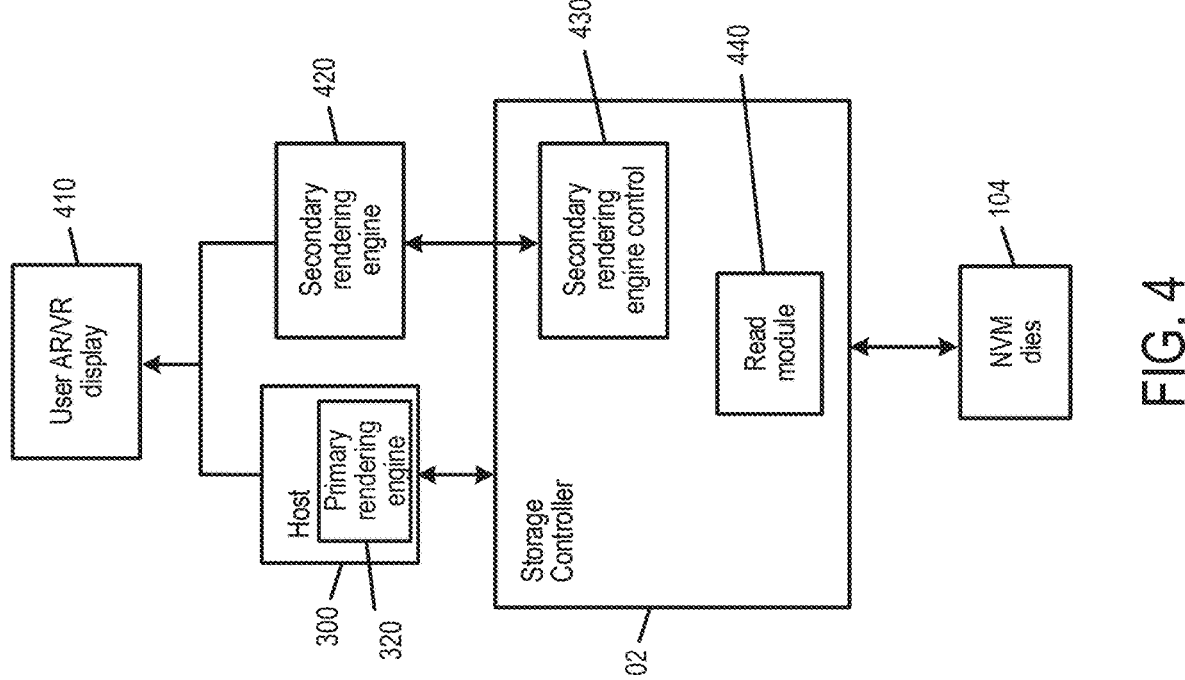
FIG. 4 is an illustration of an example architecture of an embodiment.

Turning again to the drawings, FIG. 4 is an illustration of an example architecture of an embodiment. As shown in FIG. 4, in this embodiment, the data storage device 100 is in communication with a host 300 that has a primary rendering engine 320 (implemented by one or more processors in the host 300) that renders output (e.g., audio, video, text, tactile movement, etc.) on a user's augmented reality (AR)/virtual reality (VR) display 410. In this example, the data storage device 100 comprises a storage controller 102 (having a secondary rendering control engine 430 and a read module 440), memory dies 104, and a secondary rendering engine 420, which can comprise a graphics processing unit (GPU), a frame buffer, and a small machine learning/computation engine to perform tasks that are associated with the private data (without being exposed to the host 300). The secondary rendering engine control 430 and/or read module 440 can be provided by the controller's one or more processors, individually or in combination, executing instruction code stored in a memory of the data storage device 100. Alternatively, the secondary rendering engine control 430 can be provided purely with hardware. While the secondary rendering engine 420 is part of the data storage device 100 in this example, it should be understood that the secondary rendering engine 420 can be located in a different location, such as in the host 300, in the user AR/VR display device 410, or in another location. Also, while the data storage device 100, host 300, and user AR/VR display device 410 are shown as separate devices in FIG. 4, it should be understood that one or more of these devices can be integrated with each other or with other devices. For example, the data storage device 100 can take the form of a memory card that plugs into a slot in the user AR/VR display device 410 or in the host 300.

In this embodiment, the primary rendering engine 320 in the host 300 retrieves (e.g., from the data storage device 100 or another location) non-private data and renders that data via the user's AR/VR display 410. For example, in the hospital context, the non-private data can be a first-level identification of the patient (e.g., name, age, reason why the patient is in the hospital, etc.). In addition to this non-private data, the AR/VR application in the host 300 may wish to overlay private data (e.g., criminal background of the patient, more-detailed medical data, family information, etc.) that is stored in the memory 104 of the data storage device 100 (e.g., in a different partition than the non-private data). However, in this embodiment, it is desired to avoid providing a raw/native uncompressed digital version of the private data to applications on the host 300. So, in this embodiment, the secondary rendering engine control 430 and the secondary rendering engine 420 are used to retrieve private data stored in the memory 104 and render it on the user AR/VR display device 410. This provides an isolated, secondary channel for private data, such that the uncompressed digital version of the private data is not exposed to the applications running on the host 300. While the rendered output may be accessible, that output, being in analog form (e.g., video display data), is more difficult to capture and use by the other applications in the host 300, as compared to the native, uncompressed digital data.

Figure 5:
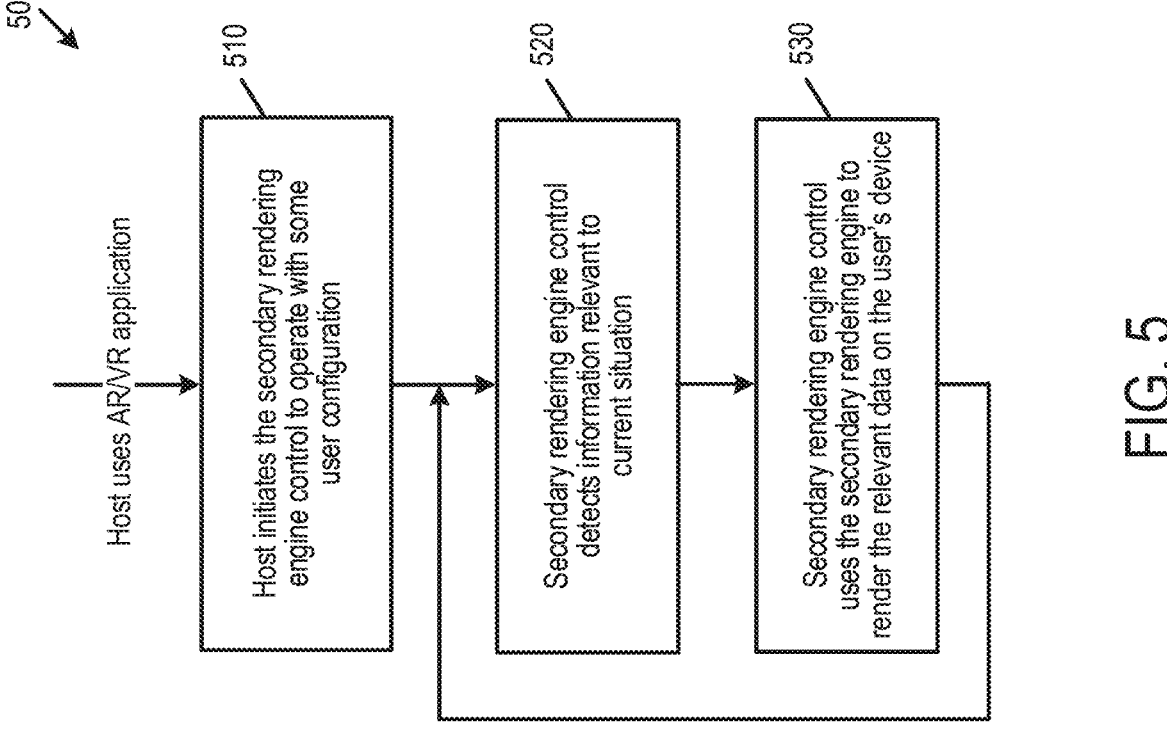
FIG. 5 is a flow chart of a method of an embodiment for using a secondary rendering engine for prioritized data.

FIG. 5 is a flow chart 500 of a method that illustrates an example usage of the secondary rendering engine 420. It should be understood that this is merely an example and that other implementations can be used. As shown in FIG. 5, the host 300 initiates the secondary rendering engine control 430 to operate with chosen user and environment configurations when the relevant application starts on the host 300 (act 510). For example, the host 300 can provide the user's identification, authentication, and/or authorization information to the secondary rendering engine control 430. In this way, the secondary rendering engine 430 provides access to the private data in a way that is tightly coupled with the authorization level of the user. With that information, the secondary rendering engine control 430 can determine if the user is authorized to access private data of the subject of the current scene. If the user is not authorized, access to the private data would be prevented.

However, if the user is authorized, the secondary rendering engine control 430 detects information that can be used to identify the private data to retrieve from the memory (e.g., private data this is relevant to the current situation/scene) (act 520). For example, the detection can be receiving, from the host 300, information (e.g., an index number, the patient's name, age, and patient ID number). that directly or indirectly allows the secondary rendering engine control 430 to retrieve the relevant private data from the memory 104 (e.g., using the read module 440). As another example, the secondary rendering engine control 430 can detect the context of the current scene from the camera/microphone of the user AR/VR display device 410 and/or the host 300 (e.g., using facial or voice recognition to identify the patient). So, the secondary rendering engine control 430 can detect information that is relevant to the current situation, based on the user, the environment, what appears on the screen from the primary rendering engine 320, etc.

Whichever way the subject/context is identified, the secondary rendering engine control 430 can allow the private data to be accessed from the memory 104 (e.g., using the read module) and provide the private data to the secondary rendering engine 420. In this example, the secondary rendering engine 420 is the authorization/authentication layer and the data retrieval element that is converting the information (e.g., index) provided by the host 300 into the specific data that needs to be retrieved/generated accordingly. In one embodiment, the secondary rendering engine control 430 does not control the operation of the secondary rendering engine 420, but such control is possible in other embodiments.

Next, the secondary rendering engine control 430 uses the secondary rendering engine 420 to render the relevant data on the user AR/VR display device 410 (act 530). This can be performed in any suitable way. For example, the secondary rendering engine 420 can contain a separate video buffer to store data that is overlaid with the main video buffer of the primary rendering engine 320. The host 300 may provide the secondary rendering engine 420 (e.g., directly or via the data storage device 100) with information on specific slots in the main video buffer of the primary rendering engine 320 in which the overlaid private data should be stored. So, in addition to being the gatekeeper to the private data, the secondary rendering engine control 430 can provide the secondary rendering engine 420 with the format of the data and how to display or playback the data. However, in other embodiments, the secondary rendering engine control 430 merely acts as the gatekeeper to the private data stored in the memory 104 of the data storage device 100. In other examples, the private data is interleaved with or binary-wise added to the non-private data, provided in a specific slot in the video buffer of the primary rendering engine 320 based on a host sync, or written to a specific buffer.

As another example, the primary rendering engine 320 can provide its video output to the secondary rendering engine 420, so that the secondary rendering engine 420 can modify that video output with the overlaid private data. In this example, the native/raw uncompressed digital version of the private data is not exposed to the host 300 and the applications running on it. Also, the secondary rendering engine 420 can output the rendered private data in a common format (e.g., key value (KV) pairs or a logical block address (LBA) format). The host 300 can communicate the target format to the secondary rendering engine 420 and/or the secondary rendering engine control 420, or the format can be pre-configured (e.g., at the factory, during an initial user set-up phase, etc.). The rendered private data can take any suitable form, such as, but not limited to, an image, text, video, audio, a bitmap, a tactile movement, etc.).

As mentioned above, in one embodiment, the controller 102 (e.g., using the read module 440) reads the private data from the memory 104 after authorization by the secondary rendering engine control 430. Due to the real-time nature of an AR/VR environment, it may be desired to treat the read of the private data as an urgent read to help ensure that the private data is timely rendered via the user AR/VR display device 410 (e.g., to satisfy a real-time latency requirement of, say five milliseconds, with minimum impact to the main workload). This can be done, for example, by bypassing the regular read host interface and using a different type of interface, such as, but not limited to, a NVMe Weighted Round Robin urgent queue. It should be noted that this type of urgent read command can be used in other contexts, such as, but not limited to gaming.

A special treatment of this type of read command can include a hardware and/or software interrupt in order to facilitate the fetching of the private data. In addition, there can be a special memory space allocation for the host 300 to collect the urgent data, apart from the main queue where the main workload data is fetched. The memory may be allocated either in the storage controller's volatile memory (e.g., SRAM or DRAM) in a host memory buffer (HMB) (e.g., host DRAM) of the host 300, or in the non-volatile memory 100 of the data storage device 100.

Figure 6:
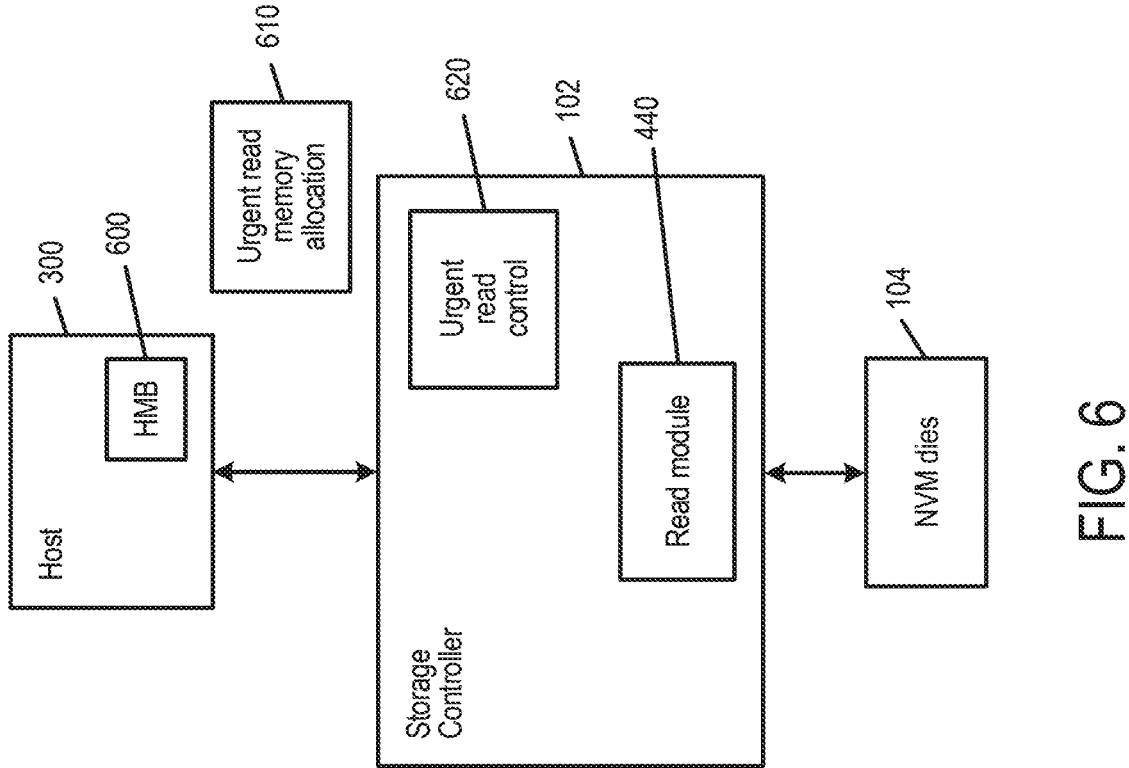
FIG. 6 is an illustration of an example architecture of an embodiment.

FIG. 6 is an illustration of an architecture of an embodiment. As shown in FIG. 6, in this embodiment, the data storage device's controller 102 is in communication with the host 300, which has a host memory buffer (HMB) 600. For example, in the Non-Volatile Memory Express (NVMe) specification, the host memory buffer 600 is allocated for exclusive use by the data storage device's controller 102, data in the host memory buffer 600 is not modified or accessed proactively by the host 300 (i.e., data is guaranteed to be valid), and the host 300 is obligated to notify the data storage device's controller 102 before any operation that might lead to data loss (e.g., in case of power loss or in case the host 300 might need the buffer) (in such cases, the host 300 lets the controller 102 acknowledge the operation before the data is lost). An HMB descriptor list on the host 300 can maintain a listing of entries associated with host data buffers for exclusive use by the controller 102. During initialization, the host software may provide the HMB descriptor list to the data storage device 100 for exclusive use by the controller 102.

The controller 102 in this example comprises an urgent read control module 620 and a read module 440. The urgent read control module 620 and/or read module 440 can be provided by the controller's one or more processors, individually or in combination, executing instruction code stored in a memory of the data storage device 100. Alternatively, one or both can be provided purely with hardware. This architecture can provide an urgent read memory allocation 610. Urgent read memory can be allocated either in the host HMB 600 or in volatile or non-volatile memory in the data storage device 100. The location can also depend on the urgency and intensity of the main workload, as determined by the urgent read control 620.

FIG. 7 is a flow chart 700 of a method of an embodiment for executing an urgent read command. As shown in FIG. 7, the urgent read control module 620 detects the urgent read amongst the main workload (act 710). Next, the urgent read control module 620 allocates memory to contain the urgent read data (act 720). The urgent read control module 620 then suspends the current main workload or issues a read ahead (act 730). Finally, the urgent read is conducted from the non-volatile memory dies 104, and the data is fetched to the allocated memory (act 740). So, in this example, once the urgent read control 620 detects the urgent read, it allocates memory buffers outside of the main workflow queue buffers to contain the data. It then either suspends the main workflow or issues a read-ahead command synchronized with the current main workflow. When the urgent read data is fetched, it is placed in the allocated memory buffers for the host to access.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention.

It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
   send, to a host, non-restricted data stored in the memory in response to receiving information from the host that identifies the non-restricted data, wherein the host comprises a primary rendering engine configured to render the non-restricted data on a display device;
   receive, from the host, information about a user;
   based on the information about the user, determine whether the user is authorized to access restricted data stored in the memory; and
   in response to determining that the user is authorized to access the restricted data, send the restricted data to a secondary rendering engine configured to render the restricted data as an overlay to the rendered non-restricted data on the display device;
wherein:
   the secondary rendering engine is not part of the host; and
   the data storage device bypasses the host by sending the restricted data directly to the secondary rendering engine so that the restricted data in its native digital form is not exposed to the host.

2. The data storage device of claim 1, wherein the display device comprises a virtual reality display device.

3. The data storage device of claim 1, wherein the display device comprises an augmented reality display device.

4. The data storage device of claim 1, wherein the secondary rendering engine is located in the data storage device.

5. The data storage device of claim 1, wherein the secondary rendering engine is located external to the data storage device.

6. The data storage device of claim 1, wherein the non-restricted data and the restricted data are stored in different partitions in the memory.

7. The data storage device of claim 1, wherein the secondary rendering engine comprises a graphics processing unit (GPU) and a frame buffer.

8. The data storage device of claim 1, wherein the one or more processors, individually or in combination, are further configured to directly or indirectly identify the non-restricted data to read from the memory from information received from the host.

9. The data storage device of claim 1, wherein the one or more processors, individually or in combination, are further configured to read the restricted data from the memory using an urgent read command.

10. The data storage device of claim 1, wherein the one or more processors, individually or in combination, are further configured to store the restricted data in a host memory buffer.

11. The data storage device of claim 1, wherein the memory comprises a three-dimensional memory.

12. A method comprising:
performing in a data storage device comprising a memory and in communication with a host comprising a primary rendering engine:

receiving requests for non-private and private data stored in the memory;

sending the non-private data to the primary rendering engine in the host to render the non-private data on a display device; and sending the private data to a secondary rendering engine external to the host to render the private data on the display device in response to a user being authorized to access the private data;

wherein:

the secondary rendering engine is not part of the host; and the data storage device bypasses the host by sending the private data directly to the secondary rendering engine so that the private data in its native digital form is not exposed to the host.

13. The method of claim 12, wherein the secondary rendering engine is further configured to receive an identification of specific slots in a video buffer of the primary rendering engine in which the rendered private data is to be stored.

14. The method of claim 12, wherein the secondary rendering engine is further configured to receive an identification of a rendering format.

15. The method of claim 12, wherein the secondary rendering engine is further configured to interleave the rendered private data with the rendered non-private data.

16. The method of claim 12, wherein the secondary rendering engine is further configured to binary-wise add the rendered private data with the rendered non-private data.

17. The method of claim 12, wherein the secondary rendering engine is further configured to receive the rendered non-private data from the primary rendering engine, modify the rendered non-private data with the rendered private data, and provide a result of the modification to the display device.

18. The data storage device of claim 1, wherein the secondary rendering engine is further configured to output the rendered private data as key value (KV) pairs or in logical block address (LBA) format.

19. The method of claim 12, wherein the display device comprises a virtual reality display device or an augmented reality display device.

20. A data storage device comprising:

a memory;

means for sending, to a host, non-restricted data stored in the memory in response to receiving information from the host that identifies the non-restricted data, wherein the host comprises a primary rendering engine configured to render the non-restricted data on a display device;

means for receiving, from the host, information about a user;

means for, based on the information about the user, determining whether the user is authorized to access restricted data stored in the memory; and means for, in response to determining that the user is authorized to access the restricted data, sending the restricted data to a secondary rendering engine configured to render the restricted data as an overlay to the rendered non-restricted data on the display device;

wherein:

the secondary rendering engine is not part of the host; and the data storage device bypasses the host by sending the restricted data directly to the secondary rendering engine so that the restricted data in its native digital form is not exposed to the host.

* * * * *